Dec. 24, 1929.　　　A. L. CURRIER　　　1,740,645
CHUCK
Original Filed Oct. 8, 1926
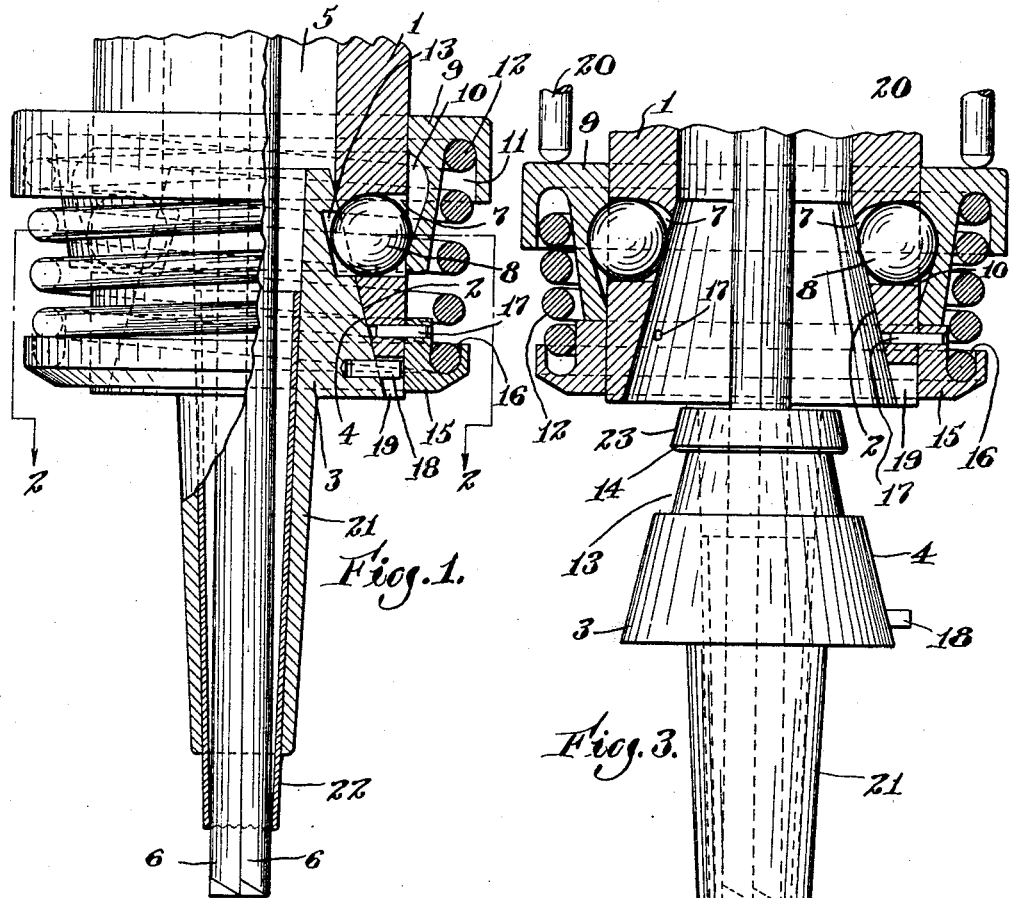
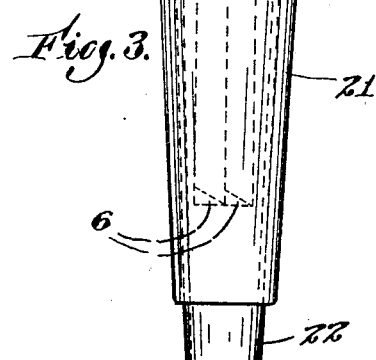
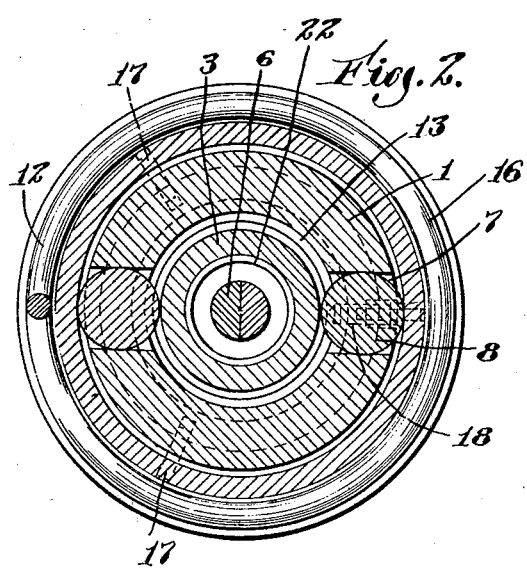
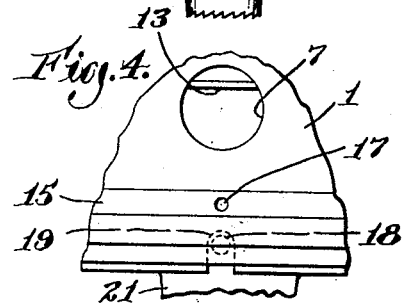
Inventor
Arthur L. Currier
by James R. Hodde
Attorney Patented Dec. 24, 1929

1,740,645

UNITED STATES PATENT OFFICE

ARTHUR L. CURRIER, OF NEW IPSWICH, NEW HAMPSHIRE

CHUCK

Original application filed October 8, 1926, Serial No. 140,371. Divided and this application filed October 11, 1926. Serial No. 140,770.

My present invention is a novel and improved chuck, devised primarily for use as a saw holding chuck in button blank cutting machines, and is a division of my prior and co-pending application, Serial No. 140,371 filed October 8, 1926.

An important feature of my present invention is the provision of a chuck to hold a saw or other cutting or holding instrumentality, which chuck will be substantially automatic in its release, as well as in the holding and engaging actions. With the provision of such a chuck, the removal and replacements of the cutting saws or other devices held by the chuck, is greatly facilitated, thereby increasing the efficiency of the particular machine in which the chuck is to be utilized.

I believe that such an automatic chuck is novel, and I have therefore claimed the same herein broadly.

The chuck illustrated herein is particularly adapted for use in button blank cutting machines, wherein the steps of operation are quick, and follow each other in rapid succession, thus requiring a chuck which will be positive in action, sturdy and compact in construction and capable of facilitating removal and replacement of the cutting devices carried thereby.

The form of chuck illustrated in the present application firmly, securely, and rigidly holds the chuck spool in position, against vertical or lateral movement, and has a minimum number of moving parts, thus greatly reducing wear. The spool of the chuck, which carries the cutting instrumentalities, while thus firmly and securely held in position, is nevertheless automatically and instantly removed from the spindle by extremely simple mechanism.

In the chuck shown herein the spool may be applied to the spindle while the spindle is rotating, and the spool will automatically find its own seat in the spindle. This ability to insert the spool in the spindle while the chuck spindle is rotating, is a very important step, and one which adds greatly to the efficiency of the machine.

I also provide novel means for alining the spool in the proper position in relation with the chuck spindle, which means will also insure positive rotation of the spool with the chuck spindle, at the same time preventing slippage or looseness of the spool within the spindle.

Further features of the invention, novel combinations of parts and advantages, will be hereinafter more fully pointed out and claimed.

Referring to the drawings illustrating preferred embodiments of my invention,

Fig. 1 is a front elevation, partly in cross section, of my novel chuck;

Fig. 2 is a cross sectional view on the line 2—2 of Fig. 1;

Fig. 3 is a front sectional elevation showing the spool holding means in disengaged position; and Fig. 4 is a fragmentary detail illustrating the spool alining means.

Referring now to Figs. 1 to 4, illustrating a prefered form of my chuck, the same comprises a spindle 1 having its inner edge bevelled as shown at 2, to receive the spool 3 having a bevelled or slanting face 4. The spool 3 is formed hollow, a illustrated at 5, to receive internally arranged work holding devices 6, the function of which work holding devices is more clearly set forth in my said co-pending application Serial No. 140,371. At opposite points are provided openings 7, to receive the spool holding and locking balls 8. Fitted around the spindle 1 is a ring 9 having an internal annular grooved or recessed portion 10, and an outer groove 11 adapted to receive the bottom portion of a coiled spring 12. The recess 10 is of sufficient extent so that, when relative movement is effected between the ring 9 and the spindle 1, each ball 8 may be forced within the recess 10 and permit the bevelled face 4 of the spool 3 to be released from locking engagement with the balls 8. The spool 3 is also provided with an annular groove or recess 13 in which a portion of the locking balls 8 fit or slide when the ring 8 and spindle 1 are in the position shown in Fig. 1, viz., when the spool 3 is locked to the spindle 1. The upper edge of the annular groove 13 is bevelled as illustrated at 14, to provide freer rolling or sliding of the balls 8. Upon release of the balls 8 from engagement with the groove 13, the spool 3 will automatically drop, of its own weight, free of the spindle 1, as will be further explained. Secured to the lower portion of the spindle 1 is a ring member 15, having a recess 16 to receive the opposite portion of the coiled spring 12, said ring being locked to the spindle 1 by one or more pins 17. I also preferably provide a driving pin or stud 18, secured to the spool 3 and sliding in a slot or recess 19 in the lower portion of the rim or edge of the spindle 1.

I provide a plurality of adjustable stops 20, 20, adapted to be held in any desired adjusted position in alignment with the ring 9. Thereupon, on actuation of the spindle 1 in vertical direction, the ring 9 will be brought into engagement with the ends of the stops 20, which will depress said ring 9 against the tension of the spring 12, bringing the recess 10 into alignment with the locking balls 8, into which recess 10 the balls 8 will move, thus moving out of the groove 13 in the spool 3 and releasing said spool and permitting the same to be instantly removed. The spool 3 has a depending shank 21, which receives the tubular saw or other cutting or working instrumentality 22. These saws are preferably of split spring metal which are driven into the slightly beveled inner walls of the shank 21 and spool 3, so that, at the saw cutting edge, the same will be a continuous line. The friction fit thus afforded by the use of the split spring metal saws or other cutting device is amply sufficient to hold the same firmly in position, while at the same time permitting the saws to be easily and quickly removed, by simply driving out in the opposite direction, and replacing a new one. This hollow arrangement of a spool 3 and shank 21 also permits of my novel work holding devices 6, 6, which are arranged to project in advance of the cutting edge of the saw 22, and may be of any suitable size, shape, and material, for the particular purpose intended.

With the spool 3 removed from the spindle 1, for any purpose, such as replacing of the saw or other cutting device, the spring 12 is still held under tension, as illustrated in Fig. 2, the ring 9 being depressed and the balls 8 resting in the recesses 10 and 7. Thereupon, when desired to reinsert the spool 3 in the spindle 1, the operator grasps the shank 21 pushing the shank and spool 3 upwardly, alining the stud or pin 18 with the slot or recess 19 in the spindle 1, and "snapping" the upper portion 23 past the balls 8 which will engage the annular groove 13 and thereupon, on release of the ring 9 from the stops 20, the balls 8 will hold and lock the spool 3 and its component parts with the spindle 1.

I believe that my chuck, as above described, is novel, and I have therefore claimed the same herein broadly.

An important advantage of the present form of chuck is the fact that the entire operation of removing the chuck spool and replacing the same may be performed without stopping the action or rotation of the spindle 1, thus greatly expediting such replacement of the chuck spool and increasing the efficiency of the machine.

It will be appreciated that while I have illustrated my novel chuck herein constructed and arranged for use in a button blank cutting machine of the type illustrated in my prior and copending application, I am not limited thereto, but my novel chuck may be utilized in any form of machine wherein quickly attached, automatically removable and positively acting chucks of this type are desired. It will also be appreciated that I may vary the size, shape, and arrangement of parts, within reasonably wide limits, without departing from the spirit of the invention.

My invention is further defined and described in the form of claims as follows:

1. A chuck, comprising a rotating spindle having recesses therein, holding and locking balls in said recesses, a tapered tool holding spool having an annular groove in the tapered surface thereof, a stud on said spool adapted to align with a slot in said spindle to drive said spool with said spindle, a spring surrounding said spindle, a relatively movable ring around said spindle having a groove therein to accommodate one portion of said spring, and a second ring affixed to said spindle and having a groove to accommodate the other end of said spring, said movable ring having a groove on its inner side normally disposed above said balls, said movable ring being depressible to bring said inner groove in the movable ring into alignment with the ball holding recesses to permit disengagement of said balls from the annular groove in said spool and to permit release of said spool from said spindle.

2. A chuck, comprising a rotating spindle having recesses therein, holding and locking balls in said recesses, a tapered tool holding spool having an annular groove in the tapered surface thereof, a spring surrounding said spindle, a relatively movable ring around said spindle having a groove therein to accommodate one portion of said spring, and a second ring affixed to said spindle and having a groove to accommodate the other end of said spring, said movable ring having a groove on its inner side normally disposed above said balls, said movable ring being depressible to bring said inner groove in the movable ring into alignment of said balls from the annular groove in said spool and permit release of said spool from said spindle.

In testimony whereof, I have signed my name to this specification.

ARTHUR L. CURRIER.